United States Patent [19]

Mondshine

[11] Patent Number: 4,621,692
[45] Date of Patent: Nov. 11, 1986

[54] WATER SOLUBLE PERFORATION PACK

[75] Inventor: Thomas C. Mondshine, Houston, Tex.

[73] Assignee: Texas United Chemical Corp., Houston, Tex.

[21] Appl. No.: 756,982

[22] PCT Filed: Mar. 28, 1985

[86] PCT No.: PCT/US85/00535

§ 371 Date: Jun. 27, 1985

§ 102(e) Date: Jun. 27, 1985

[51] Int. Cl.$^4$ ..................... E21B 33/138; E21B 43/02
[52] U.S. Cl. ................................ 166/281; 166/278; 166/292; 166/297
[58] Field of Search ............... 166/278, 281, 292, 297, 166/298, 283, 307, 312; 252/8.5 A, 8.5 B, 8.5 LC, 8.55 R

[56] References Cited

U.S. PATENT DOCUMENTS

| | | | |
|---|---|---|---|
| 2,452,654 | 11/1948 | Hayes et al. | 166/297 X |
| 3,362,475 | 1/1968 | Huitt et al. | 166/278 |
| 3,675,717 | 7/1972 | Goins, Jr. et al. | 166/278 |
| 3,814,187 | 6/1974 | Holman | 166/281 |
| 4,046,197 | 9/1977 | Gruesbeck, Jr. et al. | 166/305.1 |
| 4,175,042 | 11/1979 | Mondshine | 252/8.55 R |
| 4,186,803 | 2/1980 | Mondshine | 166/292 |
| 4,369,843 | 1/1983 | Mondshine | 166/292 |
| 4,541,487 | 9/1985 | Revett | 166/297 |

FOREIGN PATENT DOCUMENTS 8501309  3/1985  PCT Int'L. Appl. .............. 166/292

OTHER PUBLICATIONS

Suman, Jr., "Sand Control Part 3—How to Avoid Poorly Designed or Plugged Perforations that Impair Productivity and Prevent Effective Sand Control", *World Oil*, Jan. 1975, pp. 83-84, 86-88, 90-91.

Mondshine, "Completion Fluid Uses Salt for Bridging, Weighting", *Oil and Gas Journal*, Aug. 22, 1977.

Mondshine, "Crystalline Salt Systems Proving Valuable in Drilling/Completing", *Oil and Gas Journal*, Jan. 19, 1981.

Durrett et al, "Seeking a Solution to Sand Control", *Journal of Petroleum Technology*, Dec. 1977, pp. 1664-1672.

Decker et al, "Current Sand Control Practices", *Petroleum Engineer*, Dec. 1977, pp. 64, 68, 70, 74, 76, 78.

Ellis et al, "Gravel Packing Requires Clean Perforations, Proper Fluids", *World Oil*, Nov. 1981.

*Primary Examiner*—George A. Suchfield
*Attorney, Agent, or Firm*—Roy F. House

[57] ABSTRACT

Disclosed is a process of minimizing damage of the formation surrounding perforation channels in a subterranean formation during workover and completion operations when the need exists to temporarily seal the perforation channels and subsequently clean them before packing the channels with gravel. The process comprises filling the perforation channels with a water soluble particulate sized salt to form a highly permeable salt pack therein, sealing the salt pack with a low permeability film by treatment with a low fluid loss treating fluid having an aqueous phase in which the water soluble particulate sized salt is substantially insoluble, and thereafter, when desired, removing the low permeability film from the surface of the salt pack and dissolving the salt pack in an aqueous fluid in which the water soluble particulate sized salt is soluble before placing gravel within the perforation channels or before placing the well on production.

10 Claims, No Drawings

WATER SOLUBLE PERFORATION PACK

BACKGROUND OF THE INVENTION

This invention pertains to a new process to minimize any decrease in permeability of the formation surrounding the perforations in a perforated well, i.e., to prevent or minimize any damage to the formation which would decrease the flow of oil or gas from the formation through the perforations and hence into the well bore for transport to the surface.

PRIOR ART

Various procedures have been developed and utilized to increase the flow of hydrocarbons from hydrocarbon-containing subterranean formations penetrated by well bores. For example, a commonly used technique involves perforating the formation to provide flow channels therein through which hydrocarbons flow from the formation to the well bore.

In such formation perforation procedures it is important to leave the formation with maximum permeability or conductivity whereby hydrocarbons contained in the formation flow to the well bore with the least possible restriction. This can best be accomplished by: (1) preventing the entry of solids into the formation: which entry results in a decrease of the permeability of the formation, (2) utilizing well completion fluids which do not tend to swell and/or disperse formation particles contacted by the completion fluid; (3) preventing the entry of formation particles into the perforations; and (4) avoiding excessive fluid invasion into the formation.

Sand production and its control is a major problem in almost all fields that produce hydrocarbons from unconsolidated sandstone formations. Sand influx into producing wells can cause reduced productivity, loss of reserves, and added expense in combating equipment erosion and sand accumulation problems. Consequently, there is a tremendous potential for increasing profits through improved sand control.

Gravel packing inside casing is the most prevalent method of sand control. A successful inside casing gravel pack require positive placement of high permeability gravel within the critical perforation tunnels through the casing and cement, and the prevention of permeability damage within the formation around the perforation cavity beyond the cement. Basic procedures for packing gravel (actually a fine graded sand) and choosing the size of gravel to be packed are well known.

Typical applications of completion fluids in sand control procedures are in underreaming, perforating, perforation washing, as carrier fluids to place gravel in perforations or behind screens and liners, and to spot and displace acids or chemical treatments. Brine based fluids ranging from low density sea waters to very expensive commercial solutions are widely used in sand control operations. Four basic fluid properties must be considered in selecting a brine fluid for a particular application. These are: brine concentration—to prevent clay swelling and dispersion; fluid density—to provide formation pressure control; viscosity—to achieve desired solids carrying capacity; and fluid loss control—to prevent excessive whole fluid loss. The first two properties are selected based on area experience and knowledge of well properties gained during drilling. Minimum brine concentration to prevent clay reactions in most formations are generally considered to be 5 to 10% for sodium chloride, and 1% to 3% for calcium and potassium chloride brines. For well control, industry commonly designs for an overbalance of 200 to 400 psi. Fluid viscosity increases with brine concentration. It can be increased further to desired levels for suspension of solids by addition of certain water soluble polymers.

Fluid loss is controlled by the addition of polymers to "solids free" brines to increase their viscosity, or by the addition of controlled-size, solid particles. In conjunction with polymer viscosifiers, such particles bridge on the formation face and form an extremely low permeability film to prevent whole fluid loss. Materials commonly used are acid soluble calcium carbonate, oil soluble resins, and water soluble salts such as sodium chloride. The water soluble salts are used when the brine is saturated with respect to the water soluble salt. See for example the following U.S. patents of T. C. Mondshine, incorporated herein by reference: U.S. Pat. Nos. 4,175,042; 4,186,803; and 4,369,843.

The primary advantage of fluid loss control is the ability to prevent particle plugging of the critical near-well bore permeability by placing the polymer-bridging particle "filter" on the formation face.

Cleaning perforations prior to any sand control process is important. The permeability of the material in the perforation tunnel and cavity greatly influences productivity. Two techniques are well known and used to clean out perforations prior to gravel packing: pressure washing and backsurging. It is common practice to use filtered fluids for perforation washing despite evidence of severe plugging due to solids entering the fluid after filtration. Backwashing is a cleanout method in which pressurized fluids do not contact the formation. The method uses a sudden pressure underbalance to move fluids into the well bore and flush debris from perforation cavities and tunnels. Thus the potential for plugging is less than with washing. Backsurging is generally preferred to perforation washing when reservoirs are low pressured and excessive fluid loss would occur.

After cleaning the perforations the perforations are packed with selected sized sand. It is necessary to squeeze the fluid carrying the sand into the formation during sand placement in order to fill the perforation tunnels with compacted sand. Only perforation tunnels through which packing fluid flows are likely to be adequately packed.

During well completion and workover procedures there is occassionally a need to temporarily seal the perforations to prevent the entry of fluid and solids into the formation, if overbalanced, and to prevent the entry of solids from the formation into the perforations, if underbalanced. This has been accomplished in the prior art by spotting a viscous polymer pill in a solids-free brine across the perforations, or by placement of a low permeability filter cake onto the formation face utilizing polymer viscosifiers and bridging agents as noted previously. Considerable formation damage can result from these practices due to either incomplete removal of the viscous polymer pill from the formation or incomplete removal of the low permeability filter cake from the formation/perforation channel interface. In regards to the latter, even water soluble bridging solids are difficult to remove in a reasonable period of time.

SUMMARY OF THE INVENTION

Accordingly, it is an object of this invention to provide a new process of temporarily sealing the perforations in a well completion process.

It is another object of this invention to provide a new process for minimizing any decrease in permeability of the formation surrounding perforation channels therein.

It is still another object of this invention to provide a process for minimizing formation damage during perforated well completion operations.

These and other objects of the invention, which will be apparent to one skilled-in-the-art upon reading this specification and the appended claims, have been accomplished by the present invention which provides for the placement of a slurry (suspension) of specially sized salt particles across the perforations to form a highly permeable salt pack within the perforations, and thereafter sealing the surface of the salt pack with a low permeability film ("filter cake") utilizing a well completion fluid having a low fluid loss.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The methods can comprise, consist essentially of, or consist of the stated steps with the materials.

DESCRIPTION OF THE PREFERRED EMBODIMENT

In a typical well completion process, steel casing is cemented to the sides of the borehole. Thereafter the casing is perforated with a perforation tool, normally a jet perforator, to create cavities or channels through the casing and cement and into the formation surrounding the borehole. As discussed herein, the perforations in an unconsolidated sand are normally "gravel packed" by filling the perforation channels with a specially sized silica sand ("gravel") to form a high permeability gravel pack within the perforations. It is extremely important during these perforation and gravel packing procedures to prevent or minimize the entry of solids into the formation or the entry of solids into the perforation channels from the formation surrounding the channels.

During well workover operations in low pressured formations, such as in depleted sands, it is extremely important to prevent the entry of solids and fluids into the formation which decrease the permeability of the formation. Because of the low pore pressure within the formation, the workover fluid must be carefully designed to prevent an excessive pressure overbalance into the formation as well as to prevent the entry of solids into the formation.

The present invention prevents the entry of solids into the formation surrounding the perforation channels and prevents the entry of solids from the formation into the perforation channels subsequent to the well being perforated. This is accomplished by:

(a) pumping a treating fluid, hereinafter sometimes referred to as a salt pack pill, into the well and contacting the perforation channels with this treating fluid, the treating fluid comprising a saturated aqueous saline solution with at least one water soluble particulate sized salt suspended therein which is substantially insoluble in the treating fluid;

(b) filling the perforation channels with the water soluble particulate sized salt, the particle size range and distribution of the water soluble particulate sized salt being such that a high permeability salt pack is formed within the channels which is easily removed when desired by dissolving the water soluble particulate sized salt in another treating fluid which is non-saturated with respect to said water soluble particulate sized salt;

(c) forming a bridge and seal on the surface of the salt filled perforation channels to bridge and seal off the filled perforation channels by contacting the filled perforation channels with another treating fluid, hereinafter sometimes referred to as a sealing pill, comprising a saturated aqueous saline solution in which the water soluble particulate sized salt within the perforation channels is substantially insoluble having at least one particulate sized bridging material suspended therein, the bridging material having a particle size range and distribution such that a low permeability seal of the filled perforation channels is obtained; and thereafter when desired;

(d) removing the low permeability seal from the surface of the filled perforation channels: and (e) removing the water soluble particulate sized salt from within the perforation channels by dissolving the salt in still another treating solution in which the salt is soluble.

Thereafter the perforation channels can be filled with sand if desired.

The salt pack resulting from step (b) is readily dissolved and removed from the perforation tunnel in step (e) due to its high permeability. The treating fluid in step (e) can readily enter the salt pack and channeling of this treating fluid is minimized by the high permeability of the salt pack. Preferably the salt pack has a permeability higher than that of the formation surrounding the perforation channels.

The salt pack protects the perforation channels from damage by preventing their collapse, and the low permeability film or filter cake deposited on the surface of the salt pack prevents excessive invasion of the formation with fluids or solids. The low permeability film, being on the surface of the salt pack and not within the perforation channels, is readily removed in step (d). Thus by contacting the low permeability film with an appropriate fluid, or by mechanical means well known in the art, the particulate sized bridging material is removed and the low permeability film is destroyed.

The saturated aqueous saline solution utilized in steps (a) and (b) is formed by dissolving a salt or mixture of salts in water and normally the minimum density of the saturated saline solution is approximately at least 10 pounds per gallon. In those situations where it is desirable to employ the present invention with a density less than 10 pounds per gallon the saturated saline solution can be diluted with some suitable substance such as oil. In addition, the density of the saturated saline solution can be increased by the addition of sand of the type subsequently to be used to gravel pack the perforations when desired.

The saturated saline solution can be formed by dissolving any suitable salt or mixture of salts in water to form the saturated saline solution. Some salts that are generally available and which may be used include potassium chloride, sodium chloride, calcium chloride, magnesium chloride, sodium sulfate, sodium carbonate, sodium bicarbonate, sodium bromide, potassium bromide, calcium bromide and potassium carbonate.

Any water soluble salt which is substantially insoluble in the saturated saline solution may be employed in steps (a) and (b). Some which are generally available include potassium chloride, sodium chloride, calcium chloride, magnesium chloride, sodium sulfate, sodium carbonate, sodium bicarbonate, sodium bromide, potassium bromide, or calcium bromide and potassium carbonate. In some instances, it may be desired to use a mixture of these salts. The preferred particle size range of the water soluble particulate sized salt to be suspended in the saturated saline solution is in a range from about 44 microns to about 1800 microns, preferably from about 74 microns to about 300 microns. The particle size range and particle distribution is such that a high permeability salt pack fills the perforation channels. Such highly permeable salt packs are easily removed by dissolving the salt in an aqueous liquid in which the salt is soluble. Typical salt packs obtained have a permeability from about 50 millidarcies to about 5000 millidarcies, preferably from about 100 to about 2000 millidarcies. Most preferably the salt pack within the perforation channels will have a permeability greater than the permeability of the formation surrounding the channels. The permeability of the salt pack can be calculated from the average particle size of the water soluble particulate sized salt using the following formula:

$$\text{Permeability, millidarcies} = (\text{Ave. Particle Size}, \mu)^2 (0.024)$$

The quantity of the water soluble particulate sized salt to be added to the saturated saline solution may vary but is in a sufficient amount to fill the perforations at the temperature conditions in the well. Generally, from about 20 kg/m³ to about 600 kg/m³ of the water soluble particulate sized salt will be suspended in the saturated aqueous saline solution, preferably from about 20 kg/m³ to about 150 kg/m³. When the invention is employed in well bores which have increased temperatures, the water soluble particulate sized salt is added in a sufficient quantity so that even though some of it may dissolve at higher temperatures, the amount dissolved will not materially affect the ability of the water soluble particulate sized salt to fill the perforation channels with a highly permeable salt pack.

The saturated saline solution with the water soluble particulate sized salt therein as described above may be employed with any suitable viscosifier to provide the desired viscosity and suspension characteristics to the treating fluid to retain the salt particles in suspension in the saturated aqueous saline solution.

One suitable additive for obtaining desired viscosity and suspension is hydroxyethyl cellulose. Hydroxyethyl cellulose is prepared by treating cellulose with caustic and then reacting the caustic treated cellulose with about 1 to 3 moles of ethylene oxide for each anhydroglucose unit in the cellulose molecule. The viscosity of an aqueous solution of hydroxyethyl cellulose depends upon the concentration and molecular weight of the hydroxyethyl cellulose. Broadly, the hydroxyethyl cellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethyl cellulose is marketed by Union Carbide under the trademark Cellosize QP-100 MH. Hydroxyethyl cellulose is employed to increase the viscosity of the fluid and to increase the stability of the dispersion.

In general, most of the water soluble cellulose ethers can be used as a viscosifier and to provide suspension for the sized salt particles of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxyethylmethyl cellulose, hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water soluble CMC is available in various degrees of carboxylate substitution ranging from about 0.3 up to the maximum degree of substitution of 3.0. In general, CMC having a degree of substitution in the range of 0.65 to 0.95 is preferred. CMC having a degree of substitution in the range of 0.85 to 0.95 is a more preferred cellulose ether. CMC having a degree of substitution less than the above preferred ranges usually provides too low a viscosity and is thus less desirable. Said degree of substitution of CMC is commonly designated in practice as CMC-7, CMC-9, CMC-12, etc., where the 7, 9, and 12 refer to a degree of substitution of 0.7, 0.9, and 1.2, respectively. CMC having a degree of substitution of 0.7 through 0.9 serves quite well and can be used with the saturated saline and salt particles. For example, in CMHEC it is preferred that the carboxymethyl degree of substitution be at least 0.4. The degree of hydroxethyl substitution is less important and can range widely, e.g., from about 0.1 or lower to about 4 or higher.

Xanthan gum, which is used as a suspending agent, is also available commercially. It is a hydrophilic colloid produced by bacterium of the species *Xanthamonas campestris*. The colloid is a polymer containing mannose, glucose, glucuronic acid salts such as potassium glucuronate, sodium glucuronate, or the like, and acetyl radicals. Other Xanthamonas bacteria have been found which produce the hydrophilic gum and any of the xanthan gums and their derivatives can be used in this invention.

Xanthan gum is a high molecular weight linear polysaccharide that is readily soluble in water to form a viscous fluid. Examplary of the xanthan gums that can be employed is an industrial grade of xanthan gum marketed by the Kelco Company under the trademark Kelzan XC xanthan gum. Xanthan gum increases the gel strength of the fluid without appreciably increasing its viscosity.

Guar gums and their derivatives can also be used. Guar gum is a nonionic naturally occurring, high molecular weight polysaccharide. For example, hydroxypropyl guar gum and carboxymethyl hydroxypropyl guar, and quaternary ammonium guar gum may be used.

Other suitable viscosifiers and suspension agents can be employed other than those specifically mentioned above, and I have found that any one of such viscosifiers and suspension agents, or any combination of mixture of suitable viscosifier and suspension agents may be employed, including those mentioned above in any amount as may be desired and preferably in the range of about 0.5 kg/m$^3$ to about 15 kg/m$^3$ of saturated saline solution.

The treating fluid utilized in step (c) comprises a suspension of a particulate sized bridging material suspended in a saturated aqueous saline solution in which the water soluble particulate sized salt packed within the perforation channels and the particulate sized bridging material are substantially insoluble. Conveniently, and preferably, the saturated aqueous saline solutions utilized in steps (a), (b), and (c) are the same, and most preferably both comprise saturated sodium chloride solutions.

The particulate sized bridging material may be water soluble, acid soluble, or oil soluble. Examplary acid soluble materials are calcium carbonate, dolomite, Colemanite (calcium borate, $C_2B_6O_{11}.5H_2O$), Ulexite (a sodium calcium borate, $NaCaB_5O_9.8H_2O$), Probertite (a sodium calcium borate, $NaCaB_5O_9.5H_2O$), and mixtures thereof. See for example Smithey U.S. Pat. No. 3,986,964, and co-pending PCT Application Ser. No. PCT/US83/01408 filed Sept. 15, 1983 (U.S. patent application Ser. No. 06/674,378 filed Oct. 31, 1984), incorporated herein by reference. Exemplary oil soluble materials are well known in the art, such as waxes, resins and the like. See for example the following U.S. patents, incorporated herein by reference: Fisher et al. U.S. Pat. No. 3,882,029; Jackson et al. U.S. Pat. No. 3,878,141; and Jackson et al. U.S. Pat. No. 3,785,438.

Exemplary water soluble materials include the salts disclosed hereinbefore for use in steps (a) and (b). Their use in workover and completion fluids of the type utilized as the treating fluid in step (c) of the present invention is disclosed in the following U.S. patents, incorporated herein by reference: Mondshine U.S. Pat. No. 4,175,042; Mondshine U.S. Pat. No. 4,186,803; and Mondshine U.S. Pat. No. 4,369,843.

The particulate sized bridging material must have a particle size range and distribution which produces a low permeability seal or film, i.e., a workover and completion fluid which has a low fluid loss. This is well known in the art. For example, the U.S. patents and the PCT patent application referenced above disclose a particle size and range which is effective for the bridging materials disclosed therein.

Preferably the particulate sized bridging material comprises one or more of the water soluble salts disclosed previously including sodium chloride, potassium chloride, calcium chloride, magnesium chloride, sodium sulfate, sodium carbonate, sodium bicarbonate, potassium carbonate, calcium bromide, sodium bromide and potassium bromide. As disclosed in the referenced Mondshine patents, these salts to be effective in producing a low permeability film must have a particle size in the range from about 5 microns to about 800 microns wherein greater than about 5% of the particles are larger than 44 microns; preferably greater than about 50% of the particles are smaller than 30 microns. This is the preferred particle size range and distribution for all particulate sized bridging materials used. Generally the concentration of the bridging material will be in the range from about 10 kg/m$^3$ to about 150 kg/m$^3$.

The treating fluid containing the particulate sized bridging material utilized in step (c) must contain a viscosifier to keep the bridging material suspended therein. Any of the viscosifiers and the concentrations thereof disclosed for use in the treating fluid of steps (a) and (b) can be used in the treating fluid of step (c). Additionally, a fluid loss additive such as calcium lignosulfonate can also be present in the treating fluid of step (c) to further decrease the permeability of the film (i.e., "filter cake") formed on the surface of the salt pack, all as is well known in the art.

The treating fluid utilized in step (e) may be any aqueous fluid in which the water soluble particulate sized salt within the perforation channels is soluble. Thus this treating fluid must be non-saturated with respect to the water soluble particulate sized salt. Preferably this treating fluid contains one or more additives which minimizes the swelling and/or dispersion of any argillaceous materials in the subterranean formation surrounding the perforation channels, and beyond, such as potassium chloride, zirconium compounds, titanium compounds, and the like, all as is well known in the art. Most preferably this treating fluid will contain no particles which may reduce the permeability of the formation.

Conveniently the treating fluid utilized in step (e) may be the carrier fluid containing the sized sand (gravel) to be packed into the perforation channels. Thus as the water soluble particulate sized salt is dissolved in the carrier fluid, the perforation channel is opened and the sand is deposited within the perforation channel.

The treating fluid utilized in steps (a) and (b) can conveniently be present in the well bore during the perforation operations. In this manner the water soluble particulate sized salt will help prevent the entry of formation solids into the perforation channels, thus facilitating clean up of the channels.

The low permeability seal or film on the surface of the salt pack is readily removed in step (d) by either dissolving the particulate sized bridging material in an appropriate fluid, thus destroying the low permeability seal or by mechanical means. Thus if the bridging material is water soluble, a non-saturated aqueous solution can be used. If the bridging material is acid soluble, an acidic solution can be used. And if the bridging material is oil soluble, an organic solvent can be used. Since the seal is on the outside of the perforations, it can be removed by mechanical means well known in the art.

Gravel packing fluids are well known in the art. Thus such fluids contain a solids free carrier fluid, i.e., a filtered fluid, with a sized sand suspended therein with a polymeric viscosifier of the type disclosed herein.

The method of the invention may be practiced as follows:

The process of the invention may be applied to protect the perforations in a well whenever the well must be killed and protected from solids intrusion and excessive fluid and solids invasion into the formation. In a typical example, prior to gravel packing, a well must be killed and controlled in order to place a packer assembly and production screen in the well. In the practice of this invention, the kill fluid is preceded by two pills. The first pill contains the water soluble particulate sized salt suspended in a saturated aqueous saline solution as disclosed hereinbefore to fill the perforations with a highly permeable pack of the water soluble particulate sized salt. The second pill, the sealing or bridging type pill containing a particulate sized bridging material suspended therein as disclosed hereinbefore, follows immediately behind the salt pack pill. Both pills are pumped downhole by the kill fluid. Placement of the pills is accomplished by either bull heading or by circulating to kill the well. The fluids can be pumped down the tubing or down the tubing casing annulus depending on the tool assembly and downhole requirements.

The volume of each pill depends upon the placement procedure, the hole size, the downhole assembly, and tubing-casing capacity. Generally the volume requirement of each pill is estimated to adequately fill the rathole and then cover the perforated interval. Normally from about 0.5 m³ to about 1.0 m³ of the salt pack (first) pill is used, followed by a 1.5 m³ to about 3.0 m³ volume of the sealing type (second) pill. The second or sealing pill must fill the annulus of the perforation interval whereas the salt pack pill need only fill the perforations. Consequently, a much smaller volume of the salt pack pill is needed.

Once the pills have been placed and the well is killed, suitable tools can then be run into the hole and gravel placement techniques can be applied to prepare the well for production. Thereafter when desired, but before packing the perforation channels with gravel if gravel packing is desired, the sealing cake on the surface of the perforations is removed either mechanically or chemically as by dissolving the particulate sized bridging material, or a combination of these methods. Any fluid circulated across the face of the perforations will erode and mechanically remove the sealing cake by hydraulic action. Preferably the fluid is a fluid in which the particulate sized bridging material is soluble. After the sealing cake is removed from the surface of the salt pack within the perforation channels, the salt pack (i.e., the water soluble particulate sized salt) is removed by contacting the perforations with an aqueous fluid which is non-saturated with respect to the water soluble particulate sized salt. If the perforations are to be filled with gravel, the gravel carrier fluid can be formulated to dissolve the water soluble particulate sized salt and thus allow the gravel to fill the opened perforation channels.

The method can also be utilized in non-gravel pack completions or workovers. Thus a perforated well within a depleted pressure zone is highly susceptible to excessive fluid loss. The well must be controlled by temporarily sealing the perforations. The method of this invention protects the perforations and assures a subsequent effective clean-up of the perforations. The method of application is similar to the technique previously described. In this case usually a larger volume of the sealing pill may be used, such as from about 1.5 m³ to about 5 m³. After placement of the salt pack pill and the sealing type pill, well workover operations as desired may be conducted. Thereafter, the sealing cake, and water soluble particulate sized salt within the perforations, are removed as discussed hereinabove. In some cases, the well can be cleaned-up for production by swabbing or by pressure underbalance and may not require washing.

The composition of the salt pack pill requires a saturated saline solution, a viscosifier, and suspended water soluble particulate sized salt particles. A typical pill contains about 1.5–3.0 kg/m³ of a water soluble polymer, preferably Xanthamonas campestris biopolymer, and about 70 kg/m³ of 74 to 300 microns particulate sized salt in a saturated aqueous salt solution. Standard drilling or workover rig equipment and procedures are used to prepare the pill. At least 20 kg/m³ of a water soluble particulate sized salt must be present to insure that all of the suspended salt does not dissolve at downhole temperatures. Other water soluble polymers as disclosed herein can be used in place of, or in combination with, the biopolymer, such as hydroxyethylcellulose, guar gum and derivatives thereof, etc.

The composition of the sealing pill requires a saturated saline solution in which the water soluble particulate sized salt within the perforation channels is substantially insoluble, a viscosifier, and suspended particulate sized bridging materials. A typical pill contains about 5 kg/m³ of a water soluble polymer, such as *Xanthamonas campestris* biopolymer, hydroxyethylcellulose, carboxymethylcellulose, hydroxypropyl guar gum, and the like, and about 50 kg/m³ of a particulate sized bridging material having a particle size in the range from about 5 microns to about 800 microns wherein at least 5% of the particles have a particle size greater than 44 microns and wherein at least 50% of the particles have a particle size less than about 30 microns in a saturated aqueous saline solution. Standard drilling or workover rig equipment and procedures are used to prepare this sealing pill.

I claim:

1. In a well completion and workover method wherein a subterranean formation in a well is perforated to provide channels for fluids within said formation to flow to the well bore, the steps comprising:
    (a) pumping a first treating fluid into the well and contacting said perforation channels with said first treating fluid, wherein said first treating fluid comprises a saturated aqueous saline solution with at least one water soluble particulate sized salt which is substantially insoluble in said saturated aqueous saline solution;
    (b) filling said perforation channels with said water soluble particulate sized salt which is substantially insoluble in said first treating fluid, wherein said water soluble particulate sized salt has a particle size range such that said perforation channels filled with said water soluble salt have a permeability sufficiently high to affect the easy removal of said water soluble particulate sized salt from said perforation channels when desired;
    (c) forming a bridge and seal on the surface of said filled perforation channels to bridge and seal off the filled perforation channels by contacting said filled perforation channels with a second treating fluid, wherein said second treating fluid comprises a saturated aqueous saline solution in which the water soluble particulate sized salt filled within said perforation channels is substantially insoluble having suspended therein at least one particulate bridging material having a particle size range such that a low permeability seal of said filled perforation channels is obtained; and thereafter when desired;
    (d) removing said low permeability seal from the surface of said filled perforation channels; and
    (e) removing said water soluble particulate sized salt from within said perforation channels by dissolving said water soluble particulate sized salt in a third treating solution in which said water soluble particulate sized salt is soluble.

2. The method of claim 1 wherein said water soluble particulate sized salt is selected from the group consisting of sodium chloride, calcium chloride, potassium chloride, magnesium chloride, calcium bromide, sodium bromide, potassium bromide, magnesium bromide, sodium carbonate, potassium carbonate, sodium sulfate, sodium bicarbonate, and mixtures thereof.

3. The method of claim 1 wherein said water soluble particulate sized salt contains particles having a particle size in the range of approximately 44 microns to approximately 800 microns and a particle size distribution such that said filled perforation channels have a minimum permeability of about 50 millidarcies.

4. The method of claim 3 wherein the permeability of said filled perforation channels is greater than the permeability of the formation.

5. The method of claim 3 wherein said water soluble particulate sized salt is sodium chloride and wherein said particulate bridging material is sodium chloride having a particle size in the range from about 5 microns to about 800 microns wherein greater than about 5% by weight of the particles are coarser than 44 microns and wherein greater than about 50% of the particles are less than 30 microns.

6. The method of claim 1 wherein said particulate bridging material in said second treating fluid is at least one water soluble sized salt which is insoluble in said second treating fluid having a particle size in the range of approximately 5 microns to approximately 800 microns wherein greater than about 5% of the particles are coarser than 44 microns and wherein greater than 50% of the particles are less than 30 microns.

7. The method of claim 1 wherein said particulate bridging material in said second treating fluid is either water soluble, oil soluble or acid soluble and has a particle size in the range from about 5 microns to about 800 microns wherein greater than about 5% of the particles are coarser than 44 microns and wherein greater than about 50% of the particles are less than 30 microns.

8. The method of claim 1 wherein said water soluble particulate sized salt and said particulate bridging material are chemically the same differing only in particle size range and distribution.

9. The method of claim 7 wherein said water soluble particulate sized salt and said particulate bridging material are sodium chloride.

10. The method of claim 1 wherein said water soluble particulate sized salt within said perforation channels is dissolved in a gravel pack carrier fluid.

* * * * *